INVENTOR.
ARTHUR A. FINKE
BY Ely, Golrick & Flynn
ATTORNEYS

United States Patent Office 3,314,330
Patented Apr. 18, 1967

3,314,330
OVERHEAD PROJECTOR
Arthur A. Finke, Newbury, Ohio, assignor to Applied Sciences, Inc., a corporation of Ohio
Filed Mar. 4, 1965, Ser. No. 437,114
4 Claims. (Cl. 88—24)

This invention relates to an overhead projector.

Overhead projectors have come into extensive use as classroom teaching aids and for other types of lectures. Such projectors normally include a housing with a light bulb therein and a viewer plate onto which light is directed, and, outside the housing, a projection head in spaced confronting relationship to the viewer plate. The object whose enlarged image is to be projected is placed next to the viewing plate, and the light passes through it to the projection head. Most commonly, this object is a flat sheet of paper or the like which may have a drawing or diagram thereon, in which case the projector is positioned for vertical projection with its viewer plate at the top of the housing and the projection head disposed above the viewer plate, the sheet being placed directly on top of the viewer plate. However, there are other situations where a more effective presentation can be made by horizontal projection, in which the projector housing rests on one side, the viewer plate is vertical (rather than horizontal) and the projection head is in front of (not above) the viewer plate. For example, horizontal projection may be preferable where the light is to be passed through an open-topped liquid container which must be positioned upright to avoid spilling.

The change of the projector from its vertical projection position to its horizontal projection position presents a serious problem with respect to the light bulb used in the projector. This light bulb is designed to operate in an upright position with its base down. If not in an upright position, and particularly if in a horizontal position, the bulb filament will overheat relatively quickly, thus appreciably shortening the useful life of the bulb.

The present invention is directed to a novel arrangement in an overhead projector which overcomes this difficulty by providing for the adjustment of the light bulb to an upright position, whether the projector is positioned for vertical projection or for horizontal projection.

Accordingly, it is an object of this invention to provide in an overhead projector a novel and improved arrangement for supporting its light bulb in an upright position, whether the projector is used for vertical projection or for horizontal projection.

Another object of this invention is to provide such an arrangement in which the bulb is supported in a novel manner from an access door on the projector housing, which may be opened to enable the bulb to be changed manually from its vertical projection position to its horizontal projection position, or vice versa.

Further objects and advantages of this invention will be apparent from the following detailed description of a presently-preferred embodiment thereof, which is illustrated in the accompanying drawing.

Figures 1, 2, 3, 4, 5, 6, 7:
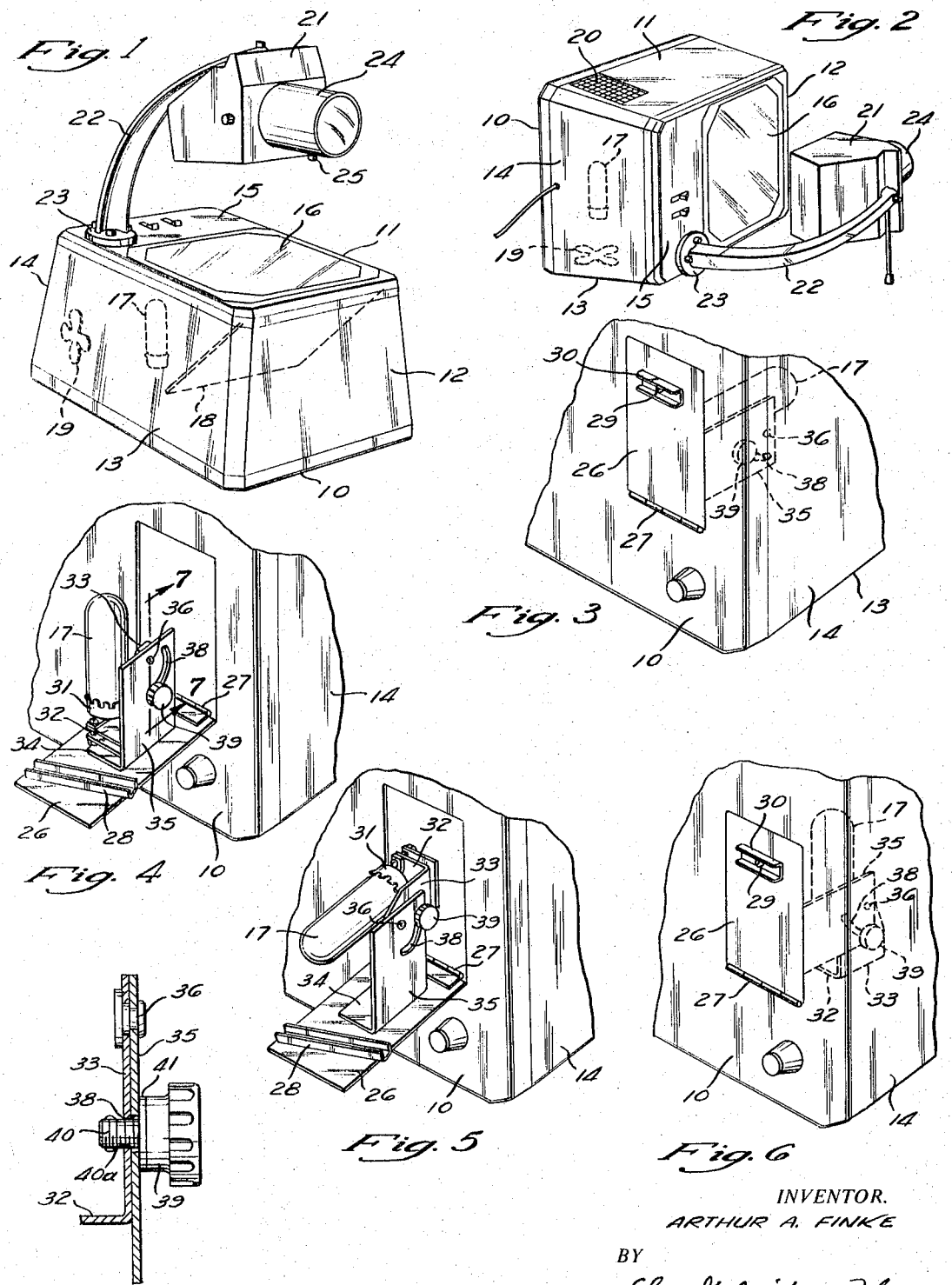
FIGURE 1 is a perspective view showing an overhead projector in its vertical projection position, with certain of its enclosed parts indicated in dotted lines.
FIGURE 2 is a similar view of this projector in its horizontal projection position.
FIGURE 3 is an enlarged fragmentary perspective view showing the closed access door on the bottom wall of the projector housing in accordance with a preferred embodiment of this invention and showing the light bulb in dotted lines extending perpendicular to this access door for use in the vertical projection position of the projector.
FIGURE 4 is a view similar to FIG. 3, with the access door open.
FIGURE 5 is a view similar to FIG. 4, but with the light bulb now adjusted to a position in which it extends parallel to the access door.
FIGURE 6 is a view similar to FIG. 3, with the access door closed but with the light bulb (in dotted lines) extending parallel to the access door for use in the horizontal projection position of the projection.
FIGURE 7 is an enlarged section taken along the line 7—7 in FIG. 4 and showing details of the adjustable support for the light bulb on the access door.

Referring first to FIG. 1, in the specific embodiment of the invention illustrated therein the overhead projector includes a box-like housing having a flat bottom 10, sides 11, 12, 13 and 14 extending up from the bottom, and a flat top 15 supported by the sides spaced above the bottom. The housing top supports a broad area, translucent, light-diffusing glass viewer plate 16 which provides a stage area.

Within this housing is mounted a light bulb 17 for directing light onto an angularly disposed mirror 18, which reflects the light up onto the viewer plate 16.

Also, within the housing there is provided a fan 19 at one side of the light bulb 17 which blows air past the light bulb and out through a grate 20 (FIG. 2) in the opposite side 11 of the housing.

A projection head 21 is carried by the upper end of a rigid arcuate support arm 22, whose opposite end 23 is bolted to the top 15 of the projector housing. This projection head carries a focusing barrel 24 with a lens arrangement which may be focused by turning an adjusting knob 25. The arm 22 supports the projection head 21 at the outside of the housing 10–15 in spaced confronting relationship to the viewer plate 16.

As shown in FIG. 1, when the housing is bottom down, the projection head 21 overlies the viewer plate 16. This is the vertical projection position of the projector which is normally used when the subject to be projected is on a sheet overlying the viewer plate 16.

However, there are situations where it is desired to project the image of the contents of an open-topped liquid receptacle by passing light through the receptacle from back to front. In such situations, the receptacle must be positioned upright and the projector housing must rest on one side, as shown in FIG. 2, rather than bottom down, as shown in FIG. 1. If the light bulb 17 is fixedly mounted inside the housing so as to extend upright in the FIG. 1 position of the projector, then it would extend horizontally in the FIG. 2 position of the projector. However, the light bulbs used in these projectors are designed for base-down operation, with the bulb extending vertically up from its base to facilitate the dissipation of heat from its filament. If operated in a horizontal position, the life of the bulb would be greatly shortened because of the inability to dissipate heat from its filament in the manner for which it is designed.

In accordance with the present invention, this problem is overcome by providing a novel support for the light bulb 17 which enables it to be positioned upright, with its base down, in the horizontal projection position of the projector (FIG. 2), as well as in its vertical projection position (FIG. 1).

Referring to FIG. 3, the bottom wall 10 of the projector housing is provided with an access door 26 near the back side wall 14, this door being hinged to the bottom wall by a hinge 27, which is at the lower end of the door when the projector is in its horizontal projection position (FIG. 2). The access door is provided with a manually releaseable latch which, in the particular embodiment shown, comprises a channel-shaped latch plate 28 (FIG. 4) at the inside of the door connected by a rivet 29 (FIG. 3) to a pivotal handle 30 (FIG. 3) at the outside of the door. When the handle 30 is in its horizontal position, as shown in FIG. 3, the opposite ends of the latch plate 28 project laterally beyond the access door 26 and snugly engage the inside face of the bottom wall 10 of the projector housing. By turning handle 30 from this position, the latch plate 28 may be released from engagement with this wall, permitting the access door 26 to be pivoted down about its hinge 27 from the closed position of FIG. 3 to the open position of FIG. 4.

Referring to FIG. 4, the lamp bulb 17 has its base received in a socket 31. This socket is bolted to a first shorter leg 32 of an L-shaped inner bracket. The second, longer leg 33 (FIG. 5) of this bracket extends perpendicular to the first leg 32 parallel to, and spaced laterally from, the light bulb 17.

An L-shaped outer bracket has one leg 34 thereof rigidly secured to the inside face of the access door. The other, longer leg 35 of this bracket extends perpendicularly away from the access door and contiguous and parallel to the second leg 33 on the first bracket, as shown in FIG. 7.

The two brackets are pivotally interconnected by a rivet 36 extending through their respective contiguous longer legs 33 and 35 at a location away from the access door. The longer leg 35 on the door-attached bracket has an arcuate slot 38 (FIG. 4), which extends through a 90° circular arc about the rivet 36 as a center.

As shown in FIG. 7, a clamping knob 39, disposed at the opposite side of the longer leg leg 35 of the outer bracket from the contiguous longer leg 33 on the inner bracket, is attached rigidly to a screw-threaded stem 40 extending inward loosely through the arcuate slot 38 in the outer bracket and threadedly received in an opening 40a in the longer leg 33 on the inner bracket. A flat washer 41 is disposed between this clamping knob 39 and the outside of the longer leg 35 on the outer bracket.

When this clamping knob 39 is loosened the inner bracket 32, 33, socket 31 and lamp bulb 17 may be turned as a unit between a first position (FIG. 4) in which the clamping knob is at the end of slot 38 closest to the access door and the light bulb extends perpendicular to the door to a second position (FIG. 5) in which the clamping knob is at the end of slot 38 away from the access door and the light bulb extends parallel to the door.

When the projector is to be used for vertical projection, with the projector housing bottom down as shown in FIG. 1, the clamping knob 39 is clamped in the position (FIG. 4) in which the lamp bulb 17 extends perpendicular to the access door 26. Thus, when the access door is closed, the bulb will extend perpendicular to the bottom wall 10 of the housing, with its base down, as shown in FIGS. 1 and 3.

If, now, the projector is to be used for horizontal projection, as shown in FIG. 2, the housing is turned to rest on its side 13, as shown in FIG. 2. Then the access door 26 is opened (FIG. 4) to make the lamp bulb 17 accessible for adjustment. Next, the clamping knob 39 is loosened, and the unitary assembly of the inner bracket 32, 33, socket 31 and lamp bulb 17 is pivoted counterclockwise in FIG. 4 about rivet 36 until it reaches the FIG. 5 position, in which the bulb 17 extends parallel to the access door 26. The clamping knob 39 is tightened again to lock the parts in this position and then the access door 26 is closed (FIG. 6). This positions the lamp bulb 17 extending upright, with its base down, parallel to the now-upstanding bottom wall 10 of the projector housing, as shown in FIGS. 2 and 6.

From the foregoing description it will be apparent that the specific embodiment shown provides a convenient, easily manipulated arrangement for adjusting the position of the lamp bulb 17 so that it will be upright with its base down, whether the projector is bottom down, for vertical projection, or on its side, for horizontal projection.

However, while a presently-preferred embodiment has been shown and described, it is to be understood that various modifications, omissions and refinements which depart from the disclosed emobdiment may be adopted without departing from the spirit and scope of this invention. For example, the clamping knob 39 may be replaced by any suitable detent arrangement, preferably spring-loaded, for locking the bulb assembly in manually releasable fashion at either of its extreme positions. Also, if desired, the inner bracket or the lamp socket may be weighted so that the lamp bulb will automatically tilt to an upright position in either the vertical projection position or the horizontal projection position of the projector. Also, if desired, the lamp assembly may include a mercury switch arranged to close the energization circuit for the lamp bulb only if the latter is in an upright position, thereby insuring that the projector can operate only if the lamp bulb is positioned upright, whether the projector is in its vertical projection position or its horizontal projection position.

I claim:

1. In a projector comprising a housing with a bottom, sides and a top, means defining a stage area normally in the top of the housing, and a projection head outside the housing supported in spaced confronting relationship to said stage area and overlying said stage area when the housing is in its normal bottom-down position, a light bulb inside said housing and means for directing light emitted from the side of said bulb onto said stage area, and a bulb support means carried by said housing and permitting turning of the bulb angularly with respect to the housing from a first position in which the bulb extends upright when the housing is positioned bottom down to a second position in which the bulb extends upright when the housing is rested on one of its sides and said projection head is in front of the stage area, whereby, in either said first or second position, the side of the bulb is positioned to avoid damage from heat generated by said bulb.

2. In a projector as defined in claim 1 including an access door in said housing in which said bulb support means is mounted and supported within said housing when said door is closed and, when said door is opened, said bulb support means is swung to the exterior of said housing to permit said bulb support means to be changed between said first and second position.

3. In an overhead projector having a housing with a bottom, sides and a top, a viewer plate at the top of the housing, and a projection head outside the housing supported in spaced confronting relationship to said viewer plate and overlying said viewer plate when the housing is positioned bottom down, the combination of a light bulb inside said housing for directing light onto said viewer plate, a socket for said light bulb, an access door on said housing, and a bulb support carried by said door and comprising an outer bracket secured to the inside of said door extending perpendicular to the door, an inner bracket supporting said socket, pivot means pivotally connecting said inner bracket to said outer bracket, said outer bracket having an arcuate slot therein concentric about said pivot means and extending through a circular arc of substantially 90°, a screw-threaded stem threadedly engaging said inner bracket and extending loosely through said arcuate slot, and a clamping knob attached to said stem at the opposite side of the outer bracket from the inner bracket, said knob when turned in one direction clamping the inner bracket to the outer bracket and when turned in the opposite direction releasing the inner bracket from the outer bracket to permit the inner bracket, socket and bulb to be turned as a unit between a first position in which said stem is at one end of said arcuate slot and, with the access door closed, the bulb extends upright when the projector housing is positioned bottom down for vertical projection and a second position in which said stem is at the opposite end of said arcuate slot and, with the access door closed, the bulb extends upright when the projector housing rests on one side for horizontal projection.

4. In an overhead projector having a housing with a bottom, sides and a top, a viewer plate at the top of the housing, and a projection head outside the housing supported in spaced confronting relationship to said viewer plate and overlying said viewer plate when the housing is positioned bottom down, the combination of a light bulb inside said housing for directing light onto said viewer plate, a socket for said light bulb, an access door on the bottom of said housing, and a bulb support carried by said door and comprising an L-shaped outer bracket having one leg thereof secured to the inside of said door and another leg extending perpendicular to the door, an L-shaped inner bracket having a first leg thereof supporting said socket and a second leg extending contiguous and parallel to said other leg of the outer bracket, pivot means positioned away from the door and pivotally interconnecting said second leg of the inner bracket to said other leg of the outer bracket, said other leg of the outer bracket having an arcuate slot therein extending through a circular arc of substantially 90° about said pivot means from an end thereof disposed toward the door to an opposite end disposed away from the door, a screw-threaded stem threadedly engaging said second leg of the inner bracket and extending loosely through said arcuate slot, and a clamping knob attached to said stem at the opposite side of said other leg of the outer bracket from said second leg of the inner bracket, said knob when turned in one direction clamping said second leg of the inner bracket to said other leg of the outer bracket and when turned in the opposite direction releasing said second leg of the inner bracket from said other leg of the outer bracket to permit the inner bracket, socket and bulb to be turned as a unit between a first position in which said stem is at said one end of said arcuate slot which is disposed toward the door and the bulb extends perpendicular to the door and a second position in which said stem is at the opposite end of said arcuate slot which is disposed away from the door and the bulb extends parallel to the door.

References Cited by the Examiner

UNITED STATES PATENTS

| | | | |
|---|---|---|---|
| 1,305,406 | 6/1919 | Peterson | 88—24 |
| 2,341,431 | 2/1944 | Fairbanks | 88—24 |
| 2,536,710 | 2/1951 | Baker | 240—52 |

NORTON ANSHER, *Primary Examiner.*

H. H. FLANDERS, R. A. WINTERCORN,
*Assistant Examiners.*